(12) United States Patent
Shu et al.

(10) Patent No.: US 7,948,931 B2
(45) Date of Patent: May 24, 2011

(54) MANET ROUTING BASED ON BEST ESTIMATE OF EXPECTED POSITION

(75) Inventors: Li Shu, Billerica, MA (US); John J. Turkovich, Westford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 2168 days.

(21) Appl. No.: 10/790,584

(22) Filed: Mar. 1, 2004

(65) Prior Publication Data

US 2005/0190717 A1    Sep. 1, 2005

(51) Int. Cl.
*H04W 4/00* (2009.01)
*H04L 12/28* (2006.01)
*H04W 24/00* (2009.01)

(52) U.S. Cl. .............. 370/328; 370/351; 455/456.1

(58) Field of Classification Search .......... 370/255, 370/338, 401, 328, 351; 455/422.1; 707/103
See application file for complete search history.

(56) References Cited

U.S. PATENT DOCUMENTS

| | | | |
|---|---|---|---|
| 5,872,773 A | 2/1999 | Katzela et al. | 370/256 |
| 5,903,559 A | 5/1999 | Acharya et al. | 370/355 |
| 5,930,254 A | 7/1999 | Liron et al. | 370/395 |
| 5,974,236 A * | 10/1999 | Sherman | 709/221 |
| 6,044,062 A | 3/2000 | Brownrigg et al. | 370/238 |
| 6,192,404 B1 | 2/2001 | Hurst et al. | 709/224 |
| 6,977,938 B2 * | 12/2005 | Alriksson et al. | 370/401 |
| 7,006,453 B1 * | 2/2006 | Ahmed et al. | 370/255 |
| 7,031,321 B2 * | 4/2006 | Habetha | 370/395.31 |
| 2001/0040895 A1 | 11/2001 | Templin | 370/466 |
| 2002/0012320 A1 | 1/2002 | Ogier et al. | 370/252 |
| 2002/0062388 A1 * | 5/2002 | Ogier et al. | 709/238 |
| 2004/0160943 A1 * | 8/2004 | Cain | 370/351 |
| 2004/0218582 A1 * | 11/2004 | Kennedy et al. | 370/351 |
| 2004/0219909 A1 * | 11/2004 | Kennedy et al. | 455/422.1 |
| 2005/0076054 A1 * | 4/2005 | Moon et al. | 707/103 Y |
| 2005/0129000 A1 * | 6/2005 | Sivakumar et al. | 370/351 |

* cited by examiner

*Primary Examiner* — Patrick N Edouard
*Assistant Examiner* — Huy C Ho
(74) *Attorney, Agent, or Firm* — Goodwin Procter LLP

(57) ABSTRACT

An apparatus and method for transmitting a file via a communications network predicts a location where a destination node will be at upon arrival of a message unit relayed via the network. An intermediate node is selected for relaying the message unit between a source node and the destination node in response to the predicted location of the destination node. The apparatus may include a location prediction processor and a relay node selector.

25 Claims, 2 Drawing Sheets

MANET ROUTING BASED ON BEST ESTIMATE OF EXPECTED POSITION

TECHNICAL FIELD

The invention generally relates to electronic communications, and, more particularly, to electronic communications in a mobile network-based communications environment.

BACKGROUND INFORMATION

Mobile ad-hoc networks ("MANETs") will likely be of growing importance for a variety of applications, such as computer-based collaborative networks and military communications. Each unit, or node, in a typical MANET may initiate, receive, and forward communications. Since the units are mobile, a functioning MANET may need to accommodate variations in a communication pathway between any two units.

A network of citizens-band radios (commonly called CB radio) is perhaps the earliest and best known example of a radio-based MANET. A CB radio, i.e., a node in a MANET made up of CB radios, has a broadcast range limited to approximately 15 miles. Three or more mobile units—located, for example, in trucks or automobiles—can participate in the exchange of communications between two units when the two units are too distant from each other for direct radio contact. In this example, those individuals controlling the additional unit(s) may relay communications between the two units that are outside of each others' direct radio contact. Such a sequence of nodes relaying messages for a pair of units forms a communication pathway, or a route, between the pair. The decisions leading to choosing a sequence of units to form a communication pathway is called routing. A communication can include, for example, a message and the identity of the intended recipient of the message.

All units in a MANET may be in constant motion. Thus, the neighboring nodes that are available for direct communication may change over time. At any given moment of time, the collective knowledge of which units are in the neighborhood of each unit in such a network is called the network's configuration. As a result of the configuration variation, a communication pathway between a pair of communicating units may vary with time.

A communication pathway can change rapidly because the quality of radio transmissions between any two adjacent units in a communications pathway may be affected by variations in, for example, the radio propagation environment and movement of the units. These changes may occur during the transmission of a single packet of information, and hence may cause the transmission of such a single packet be disrupted.

For example, in radio-based networks, the radio signals may exhibit signal strength variations. The relative movements of a transmitting node, a receiving node, and/or other structures acting as reflectors or obstructions may introduce Doppler effect-related signal distortions, may cause multi-path destructive interference, or may completely block a signal. Such factors cause pathway link characteristics to vary more dramatically and over a much larger range than encountered in traditional fixed-link networks.

As in any communications network, proper functioning of a MANET requires an effective message routing protocol, which itself may require maintenance of knowledge of variations in the network's configuration. Such information, however, typically must be disseminated through the MANET itself. Hence, the amount of networking resources (e.g., communications bandwidth and mobile unit battery power) that a routing protocol requires to function properly must also be considered in evaluating its effectiveness.

A number of routing methods have been proposed for use in MANETs. These largely employ broadcast routing of communications, where a message packet contains routing information to enable forwarding of the packet to the destination unit. Under this protocol, units forward messages using either a connectionless or connection-oriented approach. Both approaches require that each mobile unit participate in a background effort to maintain up-to-date information on network configuration variations over time, and a routing pathway is determined prior to transmission of a communication along the pathway.

Some traditional networks include mobile nodes and a fixed infrastructure to support message-forwarding instructions. Such networks create location registries to maintain a database of mobile node locations that can be shared with the nodes. A pure MANET, however, has no access to a fixed infrastructure that includes fixed nodes to provide such services. An attempt to use mobile nodes to support a location registry service can be problematic; for example, to communicate with a mobile node, a node may need to access the location registry, however, the location registry is itself carried by a mobile node.

Some alternatives to implementation of a location registry are based on a probe-once-and-then-reuse-many-times approach, such as the Ad-Hoc On-Demand Distance Vector Routing (AODV) approach. The probe-once-and-then-reuse-many-times approach, while useful in many cases, is not appropriate when the nodal mobility renders the probed route useless very quickly, i.e., when route persistence is brief. Because a route typically includes a series of links, the persistence of the route depends on the persistence of every link in the route. Hence, the persistence of a route may be brief even for moderate amounts of node movement when a route includes more than a few links.

SUMMARY OF THE INVENTION

The invention arises in part from the realization that routing of communications via a network including mobile nodes may be improved by selecting a relay node in response to one or more predicted locations of a destination node when a relayed communication arrives at the destination node. The invention is well-suited for application in wireless networks of mobile nodes that have time-varying communication links between the nodes. Principles of the invention are also useful, for example, when applied to networks in which changing node positions are not completely predictable.

Some communication systems, according to principles of the invention, feature nodes that carry information about location and trajectory of some or all nodes, either absolute or relative, in the network. In some networks, according to principles of the invention, a node originating a message estimates where the destination node is expected to be at the time a message packet is expected to reach the destination; the origin then forwards the message along a best route towards that location. A decision regarding which neighboring node to select as a next intermediate node, as well as further intermediate nodes in a path, can be made with reference to collected location and trajectory information for all the nodes in the network by the nodes currently tasked to relay this message or message unit. In general, the nodes closer to the destination possess more up-to-date information on the location and trajectory of the destination. Thus, according to principles of the invention, nodes in a network may store and update information about the location and trajectory of other nodes in the network. Prior to sending a message or message unit, an originating node can estimate a destination node's location within the network at the expected time of receipt, and may determine an associated route through the network. The estimate can be shared with, and updated by, nodes in a pathway through the network.

Nodes in the network may share their location and trajectory information with other nodes in the network, for example, via attachments to message units transmitted by the node. Such information can also be requested from other nodes, for example, by transmitting general and/or targeted broadcasts.

Accordingly, in a first aspect, the invention features a method for communicating via a network of nodes. The method includes predicting where a destination node will be upon arrival of a message unit relayed via the network, and selecting an intermediate node for relaying the message unit between a source node and the destination node in response to the predicted location of the destination node. The location may be predicted in response to state information associated with a prior state of the destination node. Such state information can include, for example, a prior speed, a prior direction, and/or a prior location of the destination node, and can include a time stamp identifying an age of the state information. The prediction can also be based, in whole or in part, on any known future (e.g., scheduled) position, trajectories, and similar information. The predictive approach supports an improved route selection process when, for example, complete node location information is unavailable.

The selection of the intermediate node can include predicting locations where some nodes of the network will be upon arrival of the message unit at each of the nodes, and the intermediate node can be selected from the nodes in response to these predicted locations and that of the destination node. More than one intermediate node can be selected from the nodes in response to the predicted locations of the nodes for relaying the message via one or more of the intermediate nodes. A node can be selected if, for example, its predicted location is within a transmission range for receipt of the message unit and/or if its predicted location is sufficiently unobstructed by physical features.

In some embodiments, the origin node and/or one or more other nodes attach state information to the message unit. The state information can include, for example, a prior speed, a prior direction, a prior destination, and/or a prior location of at least one of the source node and the other nodes. A node receiving a message unit can thus update and relay the information it possesses regarding the state of other nodes. An intermediate node can also alter a routing list of future intermediate nodes in response to updated state information.

In some embodiments, geographic information is acquired by network nodes. The information may be acquired by observing the effect of transmission on a received message unit. The geographic information can identify physical features that affect transmissions, for example, features that block, absorb, or reflect a transmission. Node selection can then be improved by assessing the impact of location on a node's suitability to relay a message unit.

The invention thus provides message routing that does not require pathway persistence, and can respond to changes in the network environment. Information on the local geography and objects that interfere with or obstruct transmissions (e.g., radio-frequency transmissions) can be factored into the routing decision. A network as a whole, according to principles of the invention, can collectively "learn" about the local geography and objects that interfere with or obstruct transmission of information.

In a second aspect, the invention features an apparatus for routing communications via a network of nodes. The apparatus can be used to implement, for example, the methods described above. The apparatus includes a location prediction processor and a relay node selector.

The location prediction processor is configured for predicting one or more locations where a destination node will appear upon arrival of a message unit at the destination node. The processor may also be configured for predicting the locations of other nodes in the network. The relay node selector may be configured for selecting an intermediate node in response to predicted locations. The selector may be configured to select one or more intermediate nodes in response to state information received from other nodes. The selector may be configured to perform both of these functions.

The apparatus can also include a state information examination unit, a geographic information storage unit, and/or a state information storage unit. The units can implement, for example, features of the methods described above.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

The terms "message," "message unit," "file," "data," and "data file" are herein understood to refer to any entity of data that may be transferred via analog or digital means. The entity may originate in analog or digital form, and, at various times, may be stored in analog or digital form. The entity is capable of transfer between two distinct physical locations via, in particular, electronic, wireless, and optically based communications, for example, network-based communications.

Figure 1:
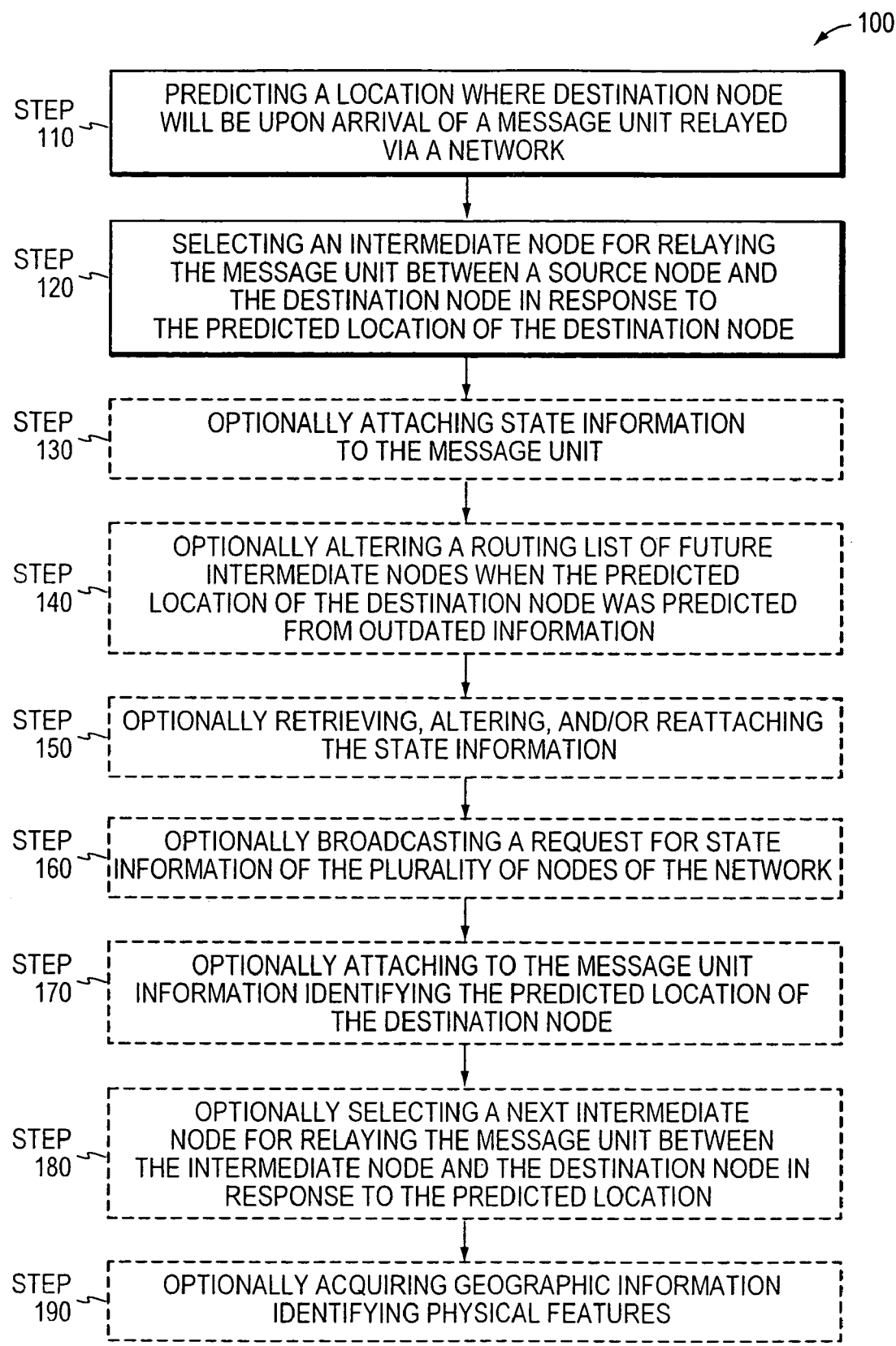
FIG. 1 is a flowchart of an embodiment of a method for communicating via a network.

FIG. 1 is a flowchart of an embodiment of a method 100 for communicating via a network that includes nodes, according to principles of the invention. The method 100 includes predicting (Step 110) where a destination node will be upon arrival of a message unit relayed via the network, and selecting (Step 120) an intermediate node for relaying the message unit between a source node and the destination node in response to the predicted location of the destination node. The message unit can be, for example, a binary data packet, the steps of predicting (Step 110) and selecting (Step 120) can be repeated for each of a series of data packet.

Predicting (Step 110) the location of the destination node permits a more intelligent route selection process when, for example, complete node location information is unavailable. The prediction may occur, for example, prior to or upon origination of the message unit by an originating node. Similarly, prediction may occur, for example, prior to or upon arrival of the message unit at any one of one or more intermediate nodes. The location may be predicted in response to state information associated with a prior state of the destination node. Such state information can include, for example, a prior speed, a prior direction, and/or a prior location of the destination node, and can include a time stamp identifying an age of the state information. As described in more detail below, state information may be attached to message units for distribution.

Predicting (Step 110) the location of the destination node may entail the origin node and/or intermediate nodes estimating the location the destination node is expected to have at the time a packet is expected to be delivered to the destination node, based on the last-known location and trajectory plan information of the destination node. The prediction may take into account the dynamics of the destination nodes and last-known information on the distribution of nodes in the network along the expected routing path, as well as any known future (e.g., scheduled) position, trajectories, and similar information. Accordingly, the invention may generate and utilize multiple predictions over different paths involving different sets of intermediate nodes, selecting, for example, the shortest path (in terms of fewest hops or expected transmission time) for transmission.

Nodes may help develop state information by, for example, determining their location and trajectory at a particular time. This determination may be performed by any of a variety of methods. For example, a node may rely on Global Positioning System technology to identify its present location, speed, and direction of movement, as well as the present time.

The state information developed by a node may be attached by the node to a message unit to be shared with other nodes. Alternatively, for example, a node may broadcast a request for state information to obtain more current information than it presently has stored. In response to a received request, a node may respond by broadcasting its current state information.

Selecting (Step 120) can include predicting where a plurality of nodes of the network will be upon arrival of the message unit at each of the plurality of nodes, and selecting the intermediate node from the plurality of nodes in response to these predicted locations and that of the destination. One or more intermediate nodes can be selected from the plurality of nodes in response to the predicted locations of the plurality of nodes and the destination node for relaying the message via one or more of the plurality of intermediate nodes. For example, a sequence of intermediate nodes can be selected from some of the plurality of nodes whose predicted location is closer to the predicted location of the destination node than is at least one other of the plurality of nodes. A node can be selected, for example, whose predicted location is within a transmission range for receipt of the message unit and/or whose predicted location is essentially unobstructed by physical features. In addition, each relaying node (or the originating node) may choose to design and/or enforce, either deterministically or probabilistically, part or whole of the remaining delivery route; this approach can be particularly helpful if the network consists of nodes with different capabilities.

Information about physical features can be provided to the network from, for example, an independent source of geographic information. Alternatively, a network can develop its own geographic information by, for example, observing the effect of geographic on message transmission. A physical feature can, for example, attenuate a transmitted signal, block the signal, or generate duplicate signals due to reflection.

The method 100 can also include causing (Step 130) at least one of the source node and the plurality of nodes to attach state information to the message unit. The state information can include, for example, a prior speed, a prior direction, a prior destination, and/or a prior location of at least one of the source node and the plurality of nodes. Thus, the origin node can include estimations with the message, as well as a time stamp associated with the last-known destination information. Each intermediate node may replace these estimations with estimations computed from their more up-to-date information regarding the destination node. Alternatively, intermediate nodes may instead retain a running log of estimations, adding new information to the log rather than replacing existing estimations; this facilitates, for example, better overall estimations through processing of diverse information and/or retention of a history for purposes of diagnosing errors and improving analysis. As described above, an intermediate node can acquire more up-to-date information from message unit relayed by the node, or by broadcasting a request for state information.

The method 100 can also include causing (Step 140) one of the selected plurality of intermediate nodes to alter a routing list of future intermediate nodes of the selected plurality of intermediate nodes in response to a predicted location of the destination node that is based on outdated information. The method 100 can also include causing the state information to be attached to the message unit, and can include causing (Step 150) the intermediate node and/or the destination node to retrieve, alter, and/or reattach the state information. Altering the state information can include replacing at least a portion of the state information with information having a more recent time stamp.

The method 100 can thus support propagation of the location and future trajectory plan information (and related dynamic information, as desired) of every mobile node to other nodes. For example, each node can attach state information for itself (and a timestamp) to every packet it forwards (and can delete an earlier entry for itself.)

The method 100 can further include causing (Step 160) a node of the network to broadcast to a plurality of nodes of the network a request for state information regarding the plurality of nodes. The method 100 can include attaching (Step 170) to the message unit information that identifies the predicted location of the destination node. The method 100 can include causing (Step 180) an intermediate node to select a next intermediate node for relaying the message unit between the intermediate node and the destination node in response to the predicted location.

The method 100 can also include acquiring (Step 190) geographic information identifying physical features that affect transmissions, for example, features that block, absorb, or reflect a transmission, as described above. The acquired geographic information can be shared by nodes in the network, as can the above-described state information. Node selection can then be improved by assessing the impact of location on a node's suitability to relay a message unit.

The method 100 thus provides message routing that does not require pathway persistence, and can respond to changes in the network environment. Information on the local geography and objects that interfere with or obstruct transmissions (e.g., radio-frequency transmissions) can be factored into the routing decision. A network as a whole, according to principles of the invention, can collectively "learn" about the local geography and objects that interfere with or obstruct transmission of information.

In one embodiment of the method 100, an intermediate node can notify a previous node in the delivery path that the previous node's information regarding the destination node is outdated. The intermediate node may then choose to halt further delivery, and may inform the previous node that it will wait for further instructions. For example, the intermediate node may wait to learn that it should resume deliver or that the previous node is broadcasting to its neighbors in support of selection of a new path.

Figure 2:
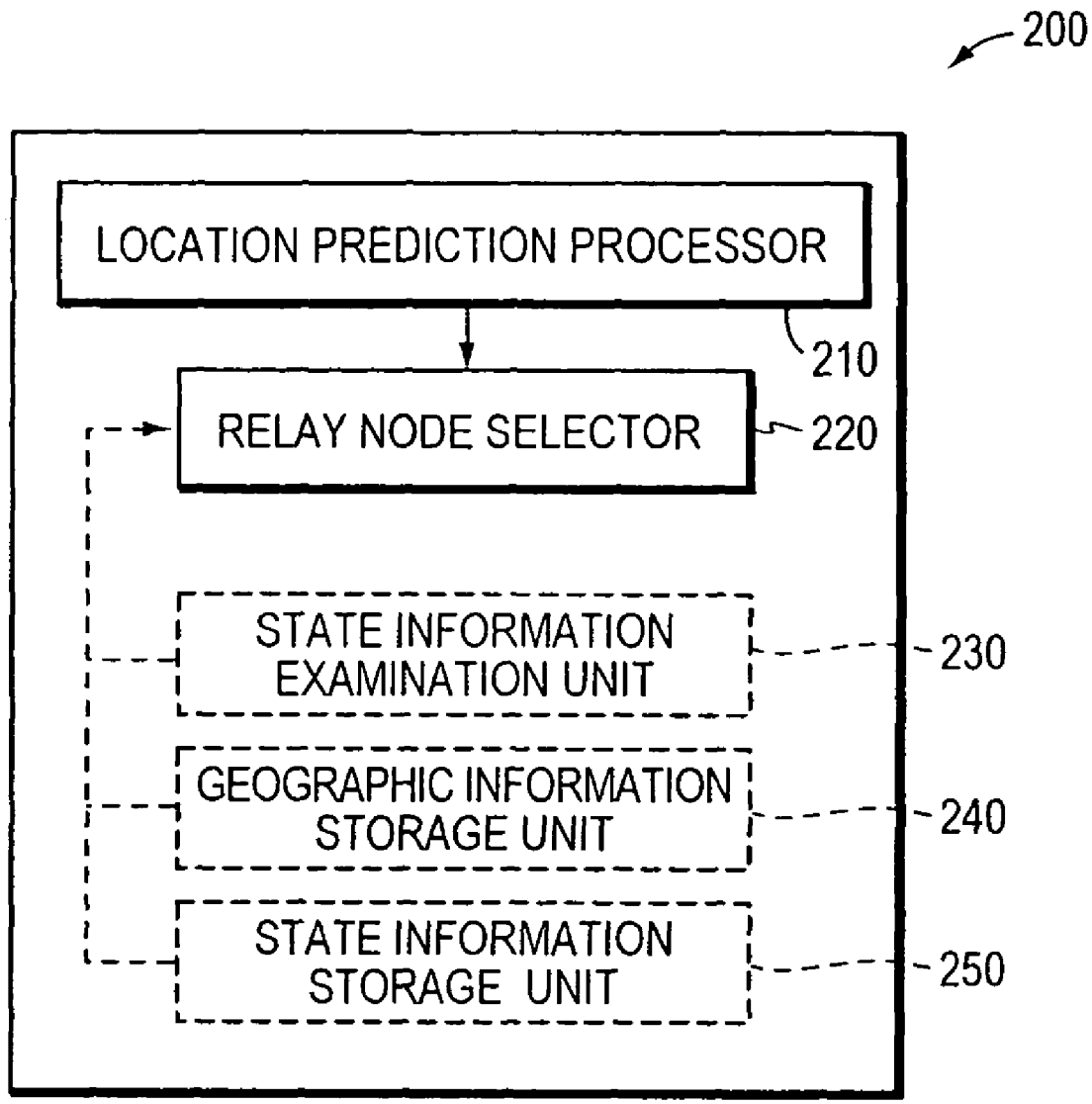
FIG. 2 is a block diagram of an embodiment of an apparatus for routing communications via a network.

FIG. 2 is a block diagram of an embodiment of an apparatus 200 for routing communications via a network of nodes. The apparatus 200 can be used to implement, for example, the method 100 described above. The apparatus 200 includes a location prediction processor 210 and a relay node selector 220.

The location prediction processor 210 is configured for predicting one or more locations that a destination node will have upon arrival of a message unit at the destination node. The processor 210 may also be configured for predicting the locations of other nodes in the network. The relay node selector 220 may be configured for selecting an intermediate node in response to predicted locations. The selector 220 may be configured to select one or more intermediate nodes in response to state information received from other nodes. The selector 220 may be configured to perform both of these functions, based, for example, on the smallest number of expected hops or the shortest overall transmission time.

The components of the apparatus 200 may be implemented in software, firmware or hardware (e.g., as an application-specific integrated circuit.) The software may be designed to run on general-purpose equipment or specialized processors dedicated to the functionality herein described. In the case of hardware implementation, the processor 210 and the selector 220 may each be, for example, one or more integrated circuits. Alternatively, a single integrated circuit may include the processor 210 and the selector 220. One or more integrated circuits may implement processing and selecting software.

The apparatus 200 can also include a state-information examination unit 230, a geographic information storage unit 240, and/or a state information storage unit 250. The units 230, 240, 250 can, for example, implement features of the method 100. Thus, the units 230, 240, 250 can support the functioning of the processor 210 and/or selector 220.

The storage units 240, 250 can be implemented, for example, via hardware and/or software modules. For example, the storage units 240, 250 can include dynamic random-access memory or non-volatile storage. The units 230, 240, 250 may be interconnected via conventional hardware and transmission protocols. The apparatus 200 typically also contains conventional network-interface hardware, which may be configured as ports, as well as programming to support transmission protocols. Communication between the apparatus 200 and other nodes may be analog or digital in nature.

The above described and various other embodiments according to principles of the invention are of particular value when applied, for example, to ad-hoc networks, MANETs, and conventional packet networks with distributed routing algorithms. Particular value accrues when applied to MANETs that include highly mobile units.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for communicating via a network comprising nodes, the method comprising:
predicting a future physical location where a destination node will be located upon arrival of a message unit relayed to the destination node via the network; and
selecting an intermediate node for relaying the message unit between a source node and the destination node in response to the predicted future physical location of the destination node.

2. The method of claim 1, wherein selecting the intermediate node comprises predicting locations where a plurality of nodes of the network will be upon arrival of the message unit at each of the plurality of nodes, and performing the selection in response to the predicted location of the destination node and the predicted locations of the plurality of nodes.

3. The method of claim 2, wherein the steps of predicting the locations of the plurality of nodes and selecting the intermediate node are performed by at least one of the plurality of nodes.

4. The method of claim 3, wherein the steps of predicting the locations of the plurality of nodes and selecting the intermediate node are performed simultaneously.

5. The method of claim 3, wherein predicting the locations of the plurality of nodes occurs upon arrival or prior to arrival of the message unit at each of the plurality of nodes.

6. The method of claim 3, further comprising sharing the predicted locations of the plurality of nodes with other nodes of the plurality of nodes.

7. The method of claim 2, wherein selecting the intermediate node comprises predicting locations where a plurality of nodes of the network will be upon arrival of the message unit at each of the plurality of nodes, and performing the selection in response to the predicted location of the destination node and the predicted locations of the plurality of nodes for relaying the message via at least one of the plurality of intermediate nodes.

8. The method of claim 7, further comprising causing at least one of the source node and the plurality of nodes to attach to the message unit state information comprising at least one of a prior speed, a prior direction, a prior destination, and a prior location of at least one of the nodes.

9. The method of claim 2, wherein selecting the intermediate node further comprises selecting a sequence of at least one intermediate node of the plurality of nodes whose predicted location is closer to the predicted location of the destination node than is at least one other node of the plurality of nodes.

10. The method of claim 1, wherein selecting the intermediate node comprises selecting a node whose predicted location is within a transmission range for receipt of the message unit.

11. The method of claim 1, wherein the location of the destination node is predicted in response to state information associated with a prior state of the destination node, the state information comprising at least one of a prior speed, a prior direction, and a prior location of the destination node, and a time stamp identifying an age of the state information.

12. The method of claim 11, further comprising causing the state information to be attached to the message unit, and causing at least one of the intermediate node and the destination node to retrieve, alter, and reattach the state information, wherein altering comprises (i) replacing at least a portion of the state information with information having a more recent time stamp or (ii) adding information having a more recent time stamp.

13. The method of claim 1, further comprising causing a node of the network to broadcast to a plurality of nodes of the network a request for state information of the plurality of nodes.

14. The method of claim 1, further comprising attaching to the message unit information identifying the predicted location of the destination node.

15. The method of claim 1, further comprising causing the intermediate node to select a next intermediate node for relaying the message unit between the intermediate node and the destination node in response to the predicted location.

16. The method of claim 1, further comprising acquiring geographic information identifying physical features.

17. The method of claim 16, wherein the physical features interfere with network communications.

18. The method of claim 16, wherein acquiring geographic information comprises inferring the physical features from attenuation of at least one transmitted signal.

19. The method of claim 16, wherein selecting the intermediate node comprises selecting a node whose predicted location is essentially unobstructed by the physical features.

20. The method of claim 1, wherein the message unit is associated with a binary data packet, and further comprising repeating predicting and selecting for each one of a series of data packets.

21. An apparatus for routing communications via a network comprising nodes, the apparatus comprising:
a location prediction processor for predicting a future physical location where a destination node will be upon arrival of a message unit at the destination node; and
a relay node selector for selecting an intermediate node for relaying the message unit between a source node and the destination node in response to the predicted future physical location of the destination node.

22. The apparatus of claim 21, further comprising a state information storage unit for storing state information associated with at least one of a prior state and a predicted state of at least one node of the network.

23. The apparatus of claim 21, further comprising a geographic information storage unit for storing geographic information identifying physical features that obstruct the network communications.

24. The apparatus of claim 21, further comprising a state information examination unit for examining state information attached to the message unit.

25. The apparatus of claim 24, wherein the state information examination unit examines geographic information attached to the message unit.

* * * * *